US008047409B2

(12) United States Patent
Schweizer et al.

(10) Patent No.: US 8,047,409 B2
(45) Date of Patent: Nov. 1, 2011

(54) DEVICE FOR THE METERED REMOVAL OF BULK MATERIAL

(75) Inventors: Peter Schweizer, Langen (DE); Stefan Breunig, Eppstein (DE)

(73) Assignee: Schenck Process GmbH, Darmstadt (DE)

( * ) Notice: Subject to any disclaimer, the term of this patent is extended or adjusted under 35 U.S.C. 154(b) by 777 days.

(21) Appl. No.: 12/092,559

(22) PCT Filed: Oct. 26, 2006

(86) PCT No.: PCT/EP2006/010307
§ 371 (c)(1),
(2), (4) Date: May 2, 2008

(87) PCT Pub. No.: WO2007/051558
PCT Pub. Date: May 10, 2007

(65) Prior Publication Data
US 2008/0230568 A1 Sep. 25, 2008

(30) Foreign Application Priority Data
Nov. 7, 2005 (DE) .......................... 10 2005 053 352

(51) Int. Cl.
*G01F 11/00* (2006.01)
(52) U.S. Cl. ............ 222/411; 222/239; 222/63; 222/55; 222/56; 221/277; 198/642; 198/778; 198/441
(58) Field of Classification Search .................. 222/410, 222/411, 63, 55, 56, 239–242, 236; 221/277; 198/642, 441, 608, 611
See application file for complete search history.

(56) References Cited

U.S. PATENT DOCUMENTS

| 3,568,894 A | * | 3/1971 | Allen et al. .................... 222/410 |
| 3,592,368 A | * | 7/1971 | Huette .......................... 222/410 |
| 4,130,225 A | * | 12/1978 | Illes, Jr. ......................... 222/411 |
| 2005/0201199 A1 | * | 9/2005 | O'Callaghan ................. 366/141 |

FOREIGN PATENT DOCUMENTS

| EP | 0 536 714 A1 | 4/1993 |
| JP | 59102727 | 6/1984 |

OTHER PUBLICATIONS

International Search Report for International Application No. PCT/EP2006/010307; mailed Jan. 26, 2007; 2 pages.
International Preliminary Report on Patentability relating to PCT/EP2006/010307, dated of mailing of Report Jun. 11, 2008, 5 pages.

* cited by examiner

*Primary Examiner* — Frederick C Nicolas
*Assistant Examiner* — Donnell Long
(74) *Attorney, Agent, or Firm* — Foley & Lardner LLP

(57) ABSTRACT

An apparatus for the metered removal of bulk material from a bin, the apparatus having a top bulk-material-filling opening, bottom bulk-material-removal opening, and a rotor that is connected in a driven manner to at least one sweeping arm disposed inside the bin near the bin's rotationally symmetrical floor and directed towards the removal opening. In order to create an apparatus for the removal of bulk material from a bin in which the mass of the removed bulk material not only can be metered very precisely, but which is also of simple design and easy to maintain, provision is made whereby the sweeping arm is attached on the bottom side of a separating element connected in a driven manner to the rotor, and whereby a settling zone is provided below the separating element in front of the sweeping arm, this zone only being open on one side to the bulk material through a feed opening, and on the other side to the removal opening.

39 Claims, 4 Drawing Sheets

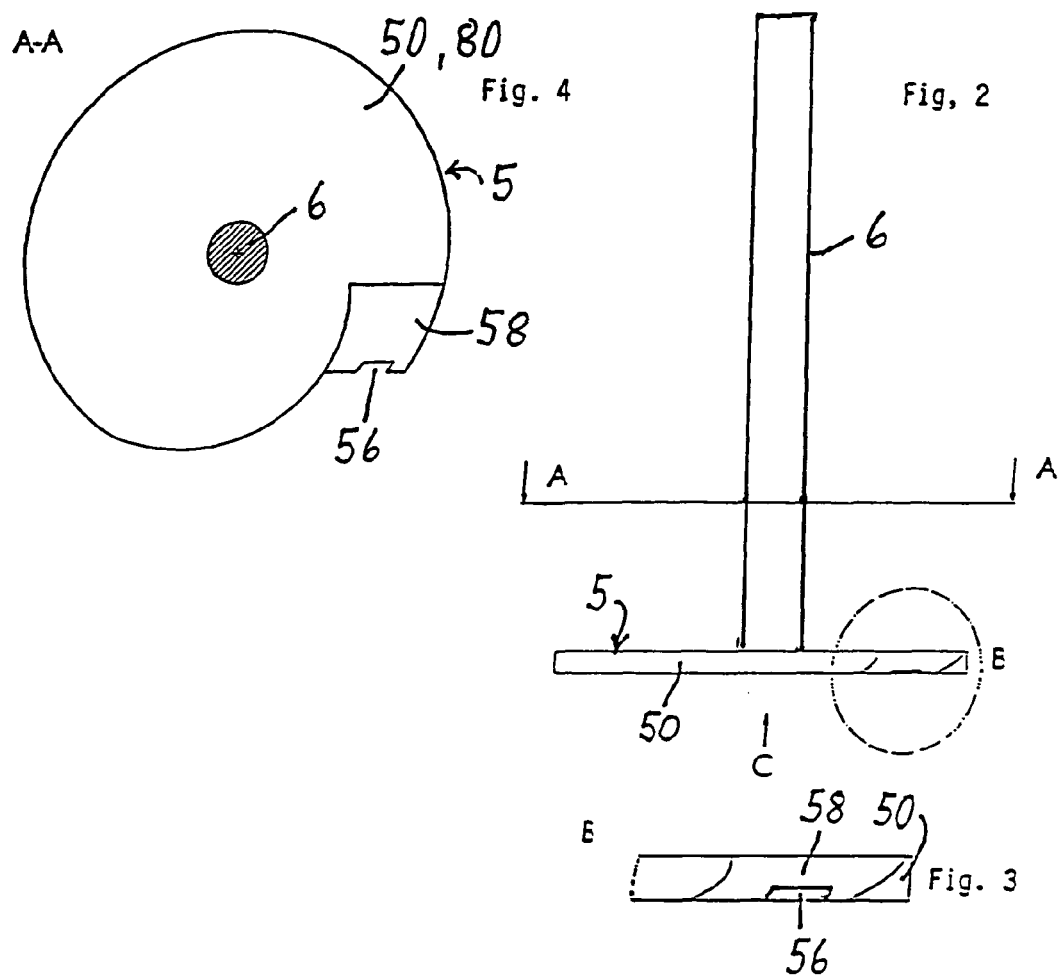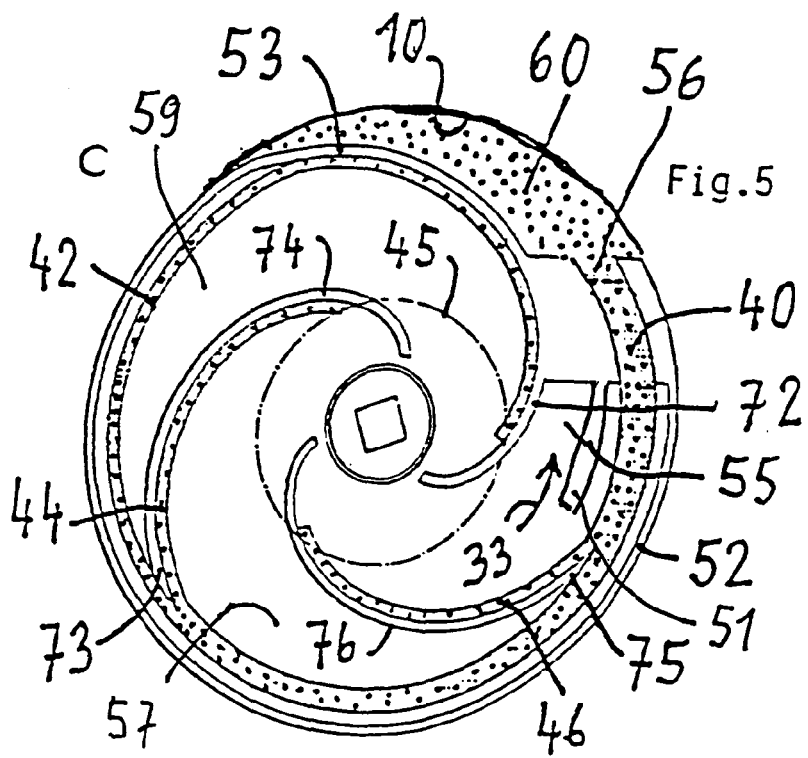

DEVICE FOR THE METERED REMOVAL OF BULK MATERIAL

CROSS-REFERENCE TO RELATED APPLICATIONS

The present application claims priority to PCT Patent Application No. PCT/EP2006/010307 filed on Oct. 26, 2006, which is hereby incorporated herein by reference in its entirety.

BACKGROUND

The invention relates to an apparatus for the metered removal of bulk material from a bin, the apparatus having a top bulk-material-filling opening and bottom bulk-material-removal opening, comprising a rotor that is connected in a driven manner to at least one sweeping arm disposed inside the bin near the bin's rotationally symmetrical floor and directed towards the removal opening.

Document DE 39 42 558 A1 describes a bin comprising a discharge apparatus in which a mesh bottom plate is disposed over a driven sweeping arm that is continually swept by an arm of an actuator device. Metering of the bulk material removed from the bin is not possible with the known discharge apparatus since the requisite bridging of the bulk material over the discharge openings that have not just been swept is not ensured and is also dependent on the material.

Document DE 33 33 115 C2 discloses a bunker that is clearable by a sweeping device in which compression of the bulk material is counteracted by an inwardly tilted cone-like bin floor. Here the gradient in the region of the tilted floor supports the conveying action of the sweeping arm, while also relieving the pressure on the bulk material. However, an apparatus of this type is unsuited for preventing the uncontrolled outflow of fluidized material.

Finally, document DE 35 03 993 A1 discloses a discharge apparatus for a bin in which a labyrinth seal is provided to increase the flow-through resistance relative to flowable masses. The seal closes the periphery of the central cone and keeps open a labyrinth gap only in the region in front of the clearing arms. However, this arrangement is disadvantageous in that compression-prone bulk materials are compressed by the long conveyance path and are therefore discharged in a nonuniform manner.

The fundamental problem to be solved by the invention is to create an apparatus for removing bulk material from a bin in which the mass of the removed bulk material can not only be metered very precisely, but which is also of simple design and very easy to maintain.

SUMMARY

In the apparatus referenced in the introduction for the metered removal of bulk material from a bin that has a top bulk-material-filling opening and a bottom bulk-material-removal opening, as well as comprising a rotor that is connected in a driven manner to at least one sweeping arm disposed inside the bin near the bin's rotationally symmetrical floor and directed towards the removal opening, the invention provides that the sweeping arm be attached at the bottom side of a separating element connected in a driven manner to the rotor, and that a settling zone be provided below the separating element in front of the sweeping arm, the settling zone being open to the bulk material only through one feed opening.

The invention implements the concept of the hardware-based separation of the functions of settling and conveying the inflowing bulk material. This approach enables any uncontrolled outflow of the fluidized bulk material as well as any compression of the material in the conveying region to be prevented. This function is effected by the inventive barrier-isolation of the settling zone relative to the inflowing bulk material, the barrier-isolation extending completely up to the feed opening, thereby reliably preventing the uncontrolled outflow of bulk material. Any compressed bulk material is allowed to decompress in the settling zone, with the result that a homogenous, constant and metered flow over time of the bulk material leaves the bin through the removal opening. The variation range or constancy of the actual discharge throughput for bulk material is approximately 0.5% of the mean actual discharge throughput. In addition, the invention is extremely maintenance-friendly since only the separating element, which can be advantageously implemented as a simple plate, needs to be removed from the bin for cleaning or for replacement, in order to be able to clean the bin, for example, when switching to a different type of bulk material, or in order to be able to perform maintenance without further obstruction—as would be the case, for example, with a discharge screw conveyor.

The invention can be employed primarily in the plastics, chemical, food, detergent, or pharmaceutical industries. The feed opening is advantageously formed in the separating element. For the separating element, an especially simple design is recommended whereby the separating element is a plate, on which the feed opening is provided, extending essentially transverse relative to centerline of the bin. In addition, it is recommended that the effective surface of the feed opening extend essentially parallel to the rotational axis of the separating element. The bulk material feed is facilitated if, in a development of the invention, a feed zone is formed in front of the feed opening, along which zone the periphery of the separating element can be displaced radially inward. Alternatively, the separating element has a passage for the feed zone that is then delimited by the separating element. A further facilitation of the feed for a defined bulk material strand is achieved by a feed opening if at the feed opening the separating element has a ramp rising from its lower end, the feed opening being formed in the ramp. Bulk material not fed in is deflected by the ramp and thus does not interfere with the formation of a homogenous bulk material strand.

If the inventive separating element is the above-mentioned plate, the barrier effect of thereof is improved by the fact that the plate has a guide wall extending downward to the floor along its periphery, where the sweeping arm can then terminate at one end at the discharge opening and at the other end transition into the guide wall. Advantageously, at least one segment of the spiral sweeping arm can then form part of the guide wall which then advantageously delimits the feed zone. In order to further improve the barrier-isolation of the settling zone and conveying zone located below the separating element, a labyrinth can be created at the rim of the separating element in interaction with the bin's inside wall, for example, by having a circumferential profile rising from the surface of the separating element along the rim of this element, the profile engaging a circumferential undercut in the bin's inside wall. Alternatively or supplementally, elastic elements such as, for example, springs can be provided that press the floor against a rim of the separating element defining the settling zone and the conveying zone.

What must be emphasized in particular is a possible approach whereby the separating element is designed such that a bulk material strand situated on the floor and fed in below the rotating separating element is at a distance from the separating element, that is, is not carried along by the separating element, aside from the desired conveying action. In an especially advantageous embodiment of the invention, multiple sweeping arms are attached to the bottom side of the separating element, which sweeping arms are circumferentially spaced relative to each other and can begin at different distances in front of the guide wall. This enables the already decompressed edge regions of a fed-in bulk material strand to be conveyed into the removal opening even before the circumferentially following sweeping arms. The separation of the fed-in bulk material strand enables the load on each individual sweeping arm, and thus compression of the bulk material strand, to be reduced. For some types of bulk material, it may be recommended that one or more of the sweeping arms each be provided with a defined passage, thereby allowing that fraction of the bulk material strand not yet to be conveyed by the relevant sweeping arm since yet sufficiently settled to reach the following sweeping arms. In addition, this allows the load on individual sweeping arm to be reduced so as to counteract any compression of the bulk material strand. In order to allow precise weighing of the bin during removal of the bulk material, it is recommended to have the other sweeping arms terminate at circumferentially equal distances at the removal opening. All sweeping arms advantageously are of an identical spiral shape.

In order for the bin to be emptied completely, a development of the invention provides that the surface of the separating element be tapered outward in the manner of a cone. This not only facilitates complete emptying but also the flow of bulk material to the feed zone. In addition, a stator can be advantageously provided above the separating element, the stator being connected to the bin and extending radially, advantageously horizontally, approximately up to the rotational axis of the separating element, which stator impedes co-rotation of the bulk material along with the separating element. If the stator is curved, it also conveys the interior bulk material outward into the feed zone. If the above-mentioned cone is preferably implemented as a static fixture separate from the separating element and is supported along the bin wall by radial braces, the braces can take on the function of the stator, with the result that no separate stator is required.

It is furthermore advantageous if at least one agitating element is provided above the stator to facilitate the flow of the bulk material, this element being allowed to rotate along with the separating element. It is recommended that the agitating element be made to lead in the rotational direction relative to the feed zone so as to improve filling.

For the purpose of adjusting the removed bulk material flow to a specified target discharge rate, one embodiment of the invention provides a control circuit for a controllable motor to drive the separating element. A scale on which the bin rests supplies the current bin weight as an actual signal to a controller that combines the received actual signal with a time signal from a timing element to generate an actual discharge rate signal and compares this with the specified target discharge rate. The comparison value is the actuating signal for the speed of the motor. It is furthermore advantageous if whenever the actual signal from the scale equals a specified minimum bin weight equaling the lowest fill level for the bin that the filling opening of the bin is unblocked, thereby allowing it to be refilled.

Other advantageous embodiments of the invention are indicated in the subordinate claims that contain primarily advantageous designs for the separating element and are to considered independent disclosure means. A nonrestricting embodiment of the invention is described below in detail based on the attached drawing. Here:

BRIEF DESCRIPTION OF THE DRAWINGS

FIG. 2 is a schematic side view of a plate-like separating element from the apparatus in FIG. 1;

FIG. 3 is a schematic view of the section B from FIG. 2;

FIG. 4 is a schematic top view of the separating element of FIG. 1;

FIG. 5 is a schematic view from below of the separating element of FIG. 4, the bulk material being illustrated by dots;

DESCRIPTION OF PREFERRED AND EXEMPLARY EMBODIMENTS

Figure 1:
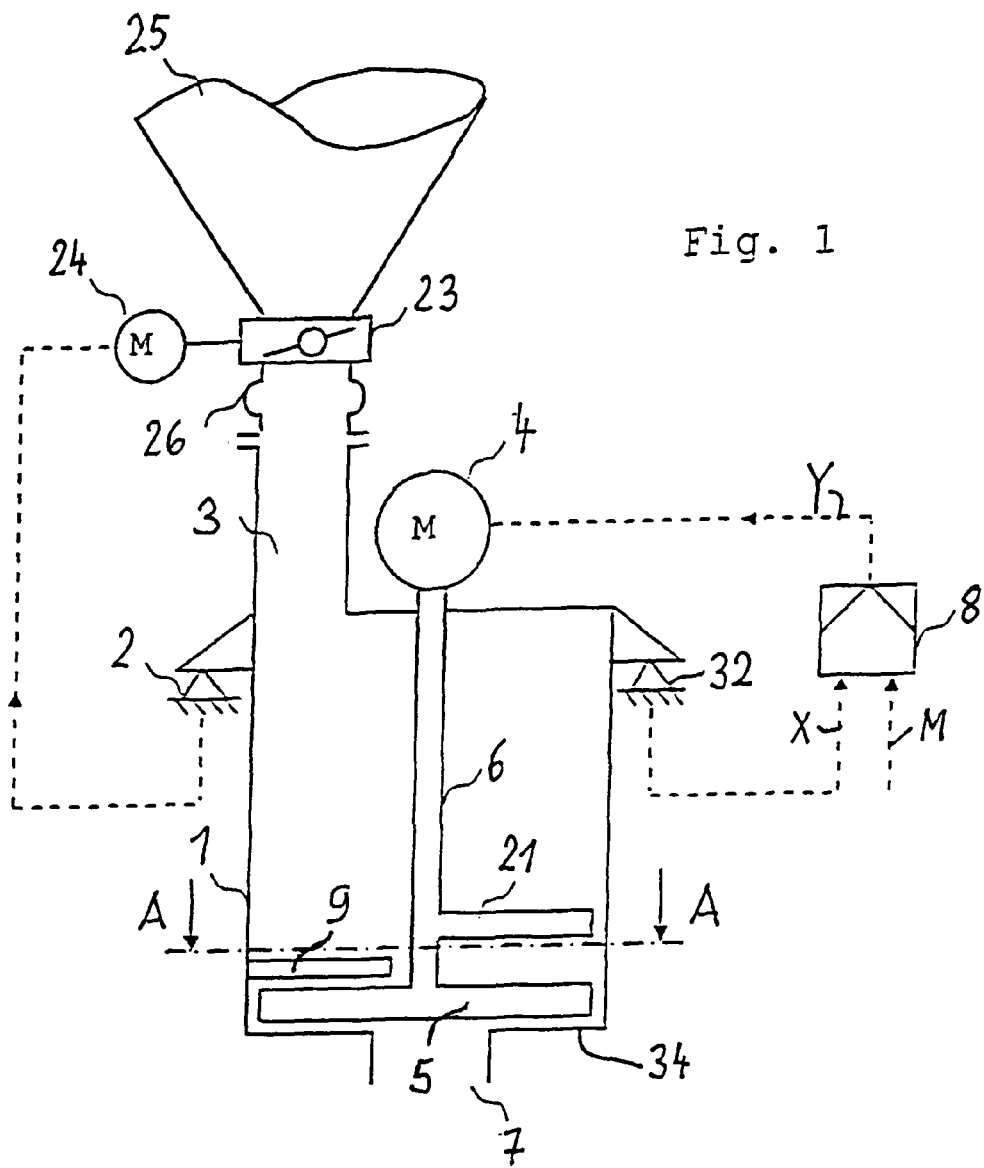
FIG. 1 is a schematic side view of an apparatus equipped with the features of the invention for the metered removal of bulk material.

The apparatus for the metered removal of bulk material from a supply bin 25 has a cylindrical bin 1 composed, for example, of stainless steel, wherein the upper bulk material filling opening 3 is connected by an intermediate connecting piece 26 to a charging door 23 on the bulk material outlet of supply bin 25. The apparatus for the metered removal can be an integrated component of the bin. The apparatus can furthermore be a stand-alone unit in the form of a differential metering scale that can be filled through filling opening 3, either manually or by a crane or similar gear.

In the embodiment shown, the bin rests on a scale that has multiple weighing cells 2, 32. A drive motor 4 is disposed outside bin 1, here at center above the bin, a rotor or drive shaft 6 of the motor extending centrally into the bin supporting a separating element 5 at center at its free end. Separating element 5 driven by motor 4 in the direction of arrow 33 removes a metered quantity of bulk material from the bulk material supply in bin 1 from the periphery thereof and conveys it to a central discharge opening 7 in the floor of bin 1 through which a metered flow of bulk material is continually discharged.

As indicated in FIGS. 2 through 5, separating element 5 has the shape of a round plate 50 with a smooth, essentially flat surface that extends transverse to drive shaft 6 and can be provided with a low-friction coating. Up to a feed zone and feed opening, to be described below, plate 50 is circular with a diameter that is only a few tenths of a millimeter smaller than the inside diameter of the bin. In any case, the periphery of plate 50 fits against the above-mentioned recess so closely with the inside bin wall 10 that the bulk material is not able to penetrate between plate 50 and the inside wall.

Below its periphery, plate 50 has a circumferential, downward-projecting rim guide wall 52 that extends closely just above floor 34, thus also forming a barrier against the penetration of bulk material. Guide wall 52 and the bottom side of plate 50 together with floor 34 thus encompass a settling (steadying, calming, stilling, stabilizing) zone that is open to the bulk material only through feed opening 56 and centrally through removal opening 45 to discharge opening 7, and in the example shown is composed of three segments 55, 57, 59 disposed in succession against the direction of rotation 33, which segments will be described below.

In order to enable the admission of a defined quantity of bulk material into first segment 55 of the settling zone through feed opening 56, a feed zone 60 for the bulk material is created by an approach whereby a delimiting segment 53 of the guide wall is displaced curved radially inward from inside wall 10, and thus from the periphery of plate 50 such that feed zone 60 expands radially and in a sickle-shaped manner up to feed opening 56. First segment 55 of the settling zone is delimited radially inward by a strip 51 that rises from the bottom side of plate 50, has the same curvature as plate 50, and extends circumferentially approximately up to the start of a first sweeping arm 76. Second segment 57 of the settling zone extends from the start of first sweeping arm along the outside thereof up to the start of second sweeping arm 74, and third segment 59 of the settling zone extends from the outside of second sweeping arm 74 up to the start of third sweeping arm 72 that is formed in part by segment 53.

At the site of the greatest radial expansion of feed zone 60, a ramp 58 is formed on the bottom side of plate 50, the ramp rising from the bottom edge of the start of guide wall 52 and from the bottom edge of the radially-further-inward end of segment 53 up to the top side of plate 50. The here rectangular feed opening 56 is cut into the essentially flat ramp 58 up to a specified height that is generally lower than that of ramp 58. In addition, feed opening 56 has a smaller width than the width of ramp 58 and is spaced a significant distance from the outer edge of ramp 58.

As FIG. 5 shows, which provides a view of the bottom side of plate 50 from the perspective of floor 34 when the bin is filled with bulk material and after one complete revolution of plate 50 relative to bin 1, the bulk material rests, as indicated by the dotted regions, only on floor 34 in feed zone 60. From this bulk material, plate 50 rotating in direction 33 continually takes up through feed opening 56 a bulk material strand 40 that is conveyed by sweeping arms 72, 74, 76 into removal opening 45, and from this opening into discharge opening 7.

All of the sweeping arms rise from the bottom side of plate 50 at the same height as guide wall 52 and its segment 53. In addition, all have the same curvature. Third sweeping arm 72, the one the furthest distance from feed opening 56, starts at guide wall 52, is curved in a spiral fashion inward towards the center of plate 50, and terminates over removal opening 45. Up to the bottom edge of ramp 58, sweeping arm 72 is identical to segment 53. Second sweeping arm 74 is also curved in a spiral fashion, also terminates over removal opening 45, and starts at a cutting edge 73 that is disposed at a circumferential angle of approximately 180° behind feed opening 56 at a distance radially within guide wall 52, where the distance corresponds to approximately one third the width of bulk material strand 40 plus the distance of strand 40 from guide wall 52. First sweeping arm 76 located closest to the feed opening also terminates over removal opening 45, is curved in a spiral fashion inward towards the center of plate 50, and starts at a cutting edge 75 that is disposed at a circumferential angle of approximately 45° behind feed opening 56 at a distance from guide wall 52 corresponding to approximately two thirds the width of bulk material flow 40 plus the distance of strand 40 from guide wall 52.

When plate 50 rotates, the described arrangement of sweeping arms 72, 74, 76 causes bulk material flow 40, fed in initially behind feed opening 56 into segment 55, to be successively divided up into three bulk material strands 42, 44, 46 that are fed separately from each other to removal opening 45. Due to the arrangement and design of the feed opening, bulk material strand 40 remains separated a sufficient distance from rotating plate 50; for example, it does not contact either guide wall 52 or strip 51 or the bottom side of plate 50. In first segment 55 of the settling zone, the fed-in bulk material strand 40 has thus sufficiently settled, that is, reduced inhomogeneities in its composition, such that at least approximately the inner third 46 of strand 40 can be considered to have settled. As a result, this third 46 can first be conveyed by first sweeping arm 76 to removal opening 45. Sweeping arm 76 is thus charged with only a part of strand 40, with the result that any recompression of partial strand 46, if present at all, is in any case very minor.

After separation of the first third, the remaining strand continues to settle principally at its edge in second segment 57 of the settling zone, thereby allowing second third 44 of strand 40 to be conveyed by second sweeping arm 74 to the removal opening. After further settling of remaining third 42 of bulk material strand 40 in third segment 59 of the settling zone, this third can be conveyed by third sweeping arm 72. The individual segments 55, 57 and 59 of the settling zone each terminate where the respective sweeping arm 76, 74, 72, meets the respective bulk material strand and thus begins conveyance thereof to removal opening 45. The segments 55, 57, 59 are of different lengths circumferentially. What is evident is the concept implemented here whereby the fed-in bulk material strand 40 is first settled in segments 55, 57, 59 of the settling zone, and only then is conveyed to removal opening 45 by the sweeping arm(s). The invention obviously can also be implemented as well with only one sweeping arm, for example, sweeping arm 72, where the settling zone is then lengthened accordingly.

The division of bulk material strand 40 into partial strands 46, 44, 42 also functions to keep the load on individual sweeping arms 76, 74, 72, and thus any bulk material recompression after settling, as low as possible. In addition, the conveyance paths for strand 40, and partial strands 42, 44, 46, are implemented as short as possible so as to keep recompression of the bulk material during conveyance as low as possible. The minimum length of the conveyance path is determined by the distance of the outer edge of strand 40 from the start of removal opening 45. Notwithstanding the figures, the selected diameter of the circular removal opening 45 can thus be significantly larger, where the sweeping arms can extend in a straight line to the removal opening.

Figure 6:
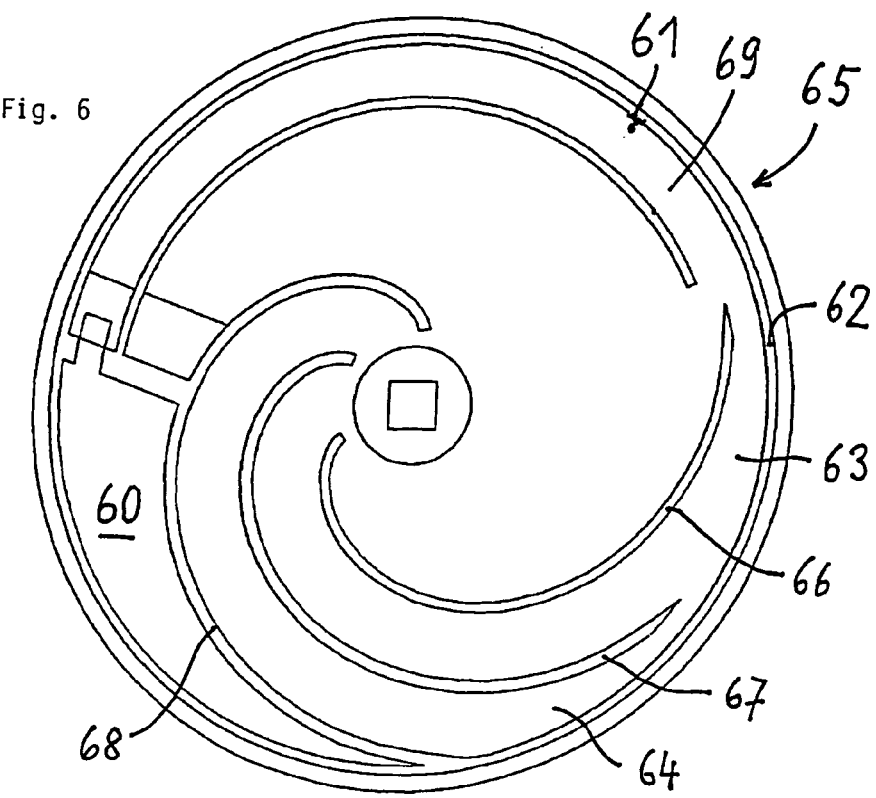
FIG. 6 is a schematic view from below of a second embodiment of the separating element.

The plate 65 of FIG. 6 differs from plate 50 first of all by the fact that it has an overall circular shape. As a result, rim guide wall 62 encircles the entire circumference of plate 65. In addition, the segment 69 of the settling zone for strand 40 is significantly longer, up to approximately 150° behind feed opening 56. The circumferentially successive segments 63, 64 of the settling zone are accordingly of shorter design. The strip 61 is of a corresponding length. Feed zone 60 is created here by a passage in plate 65, with the result that feed zone 60 is delimited externally by part of rim guide wall 62. As is further evident from FIG. 6, the three sweeping arms 66, 67, 68 no longer terminate at the same circumferential distances over the removal opening.

Figure 7:
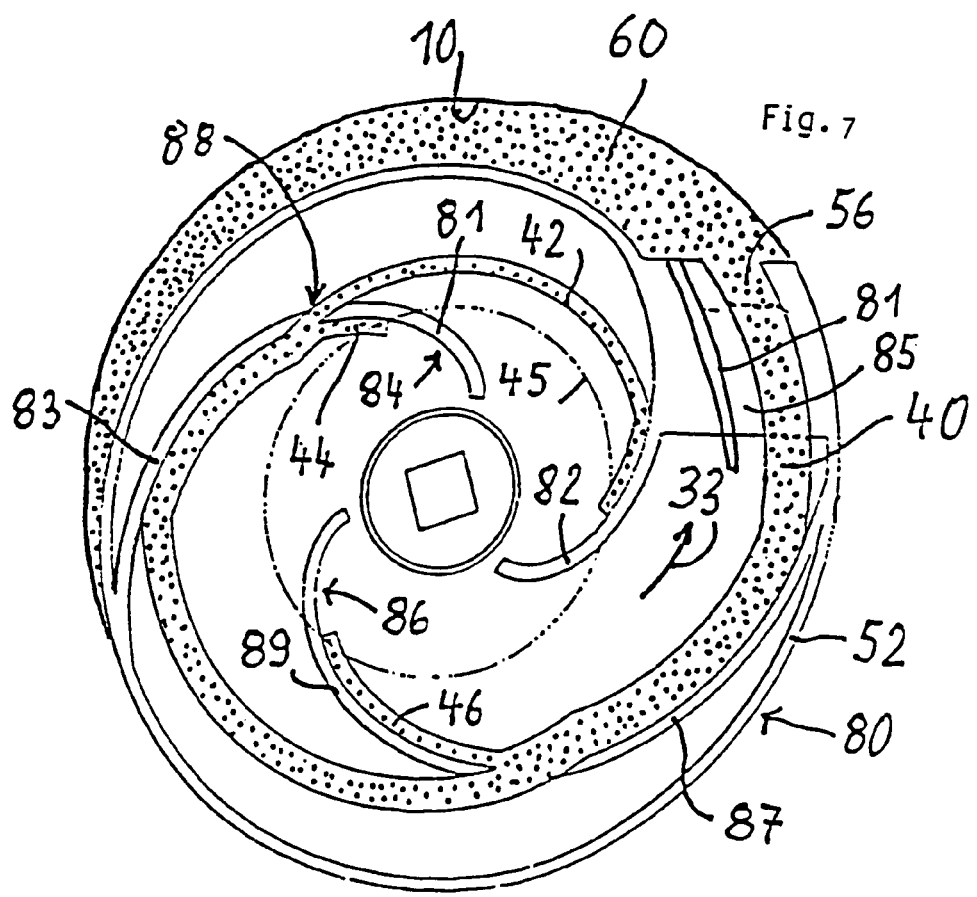
FIG. 7 is a schematic view from below of a third embodiment of the separating element.
Figure 8:
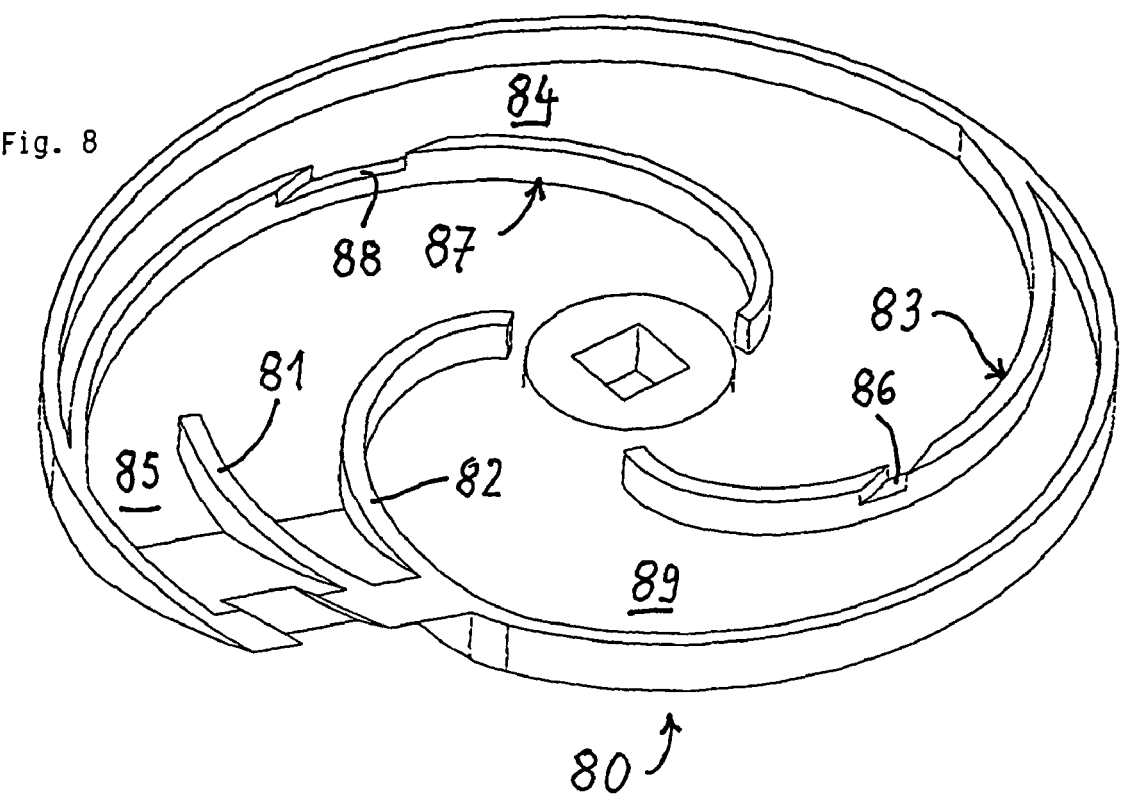
FIG. 8 is a schematic perspective view of the separating element of FIG. 7.

Plate 80 of FIGS. 7 and 8, where FIG. 7 provides the same view as FIG. 5, differs from plate 60 in terms of another design for the sweeping arms. Identical parts as seen in FIG. 5 are provided with identical reference notations. Approximately at the center of its longitudinal extent, the first sweeping arm 87 has an opening 88 that starts from the free bottom side of sweeping arm 87 and has approximately the width of strand 40. Similarly, the circumferentially following sweeping arm 83 has approximately in the last third of its longitudinal extent an opening 86 that starts from the free bottom side of sweeping arm 83 and has a somewhat smaller width than opening 88.

Strand 40 fed in through feed opening 56 is able to decompress in first segment 85 of the settling zone that is inwardly delimited by strip 81 until the strand is pushed or conveyed inward by first sweeping arm 87. During this conveyance, the strand normally builds up in terms of height from which opening 88 collects the upper part 46 and allows the lower part of strand 40 to pass into the following segment 84 of the settling zone, while the collected part of the strand 46 is conveyed further by first sweeping arm 87 to removal opening 45. The lower part of the strand can continue to settle in segment 84 until it is pushed further inward by sweeping arm 83. The height again built up here is collected through opening 86 and conveyed by sweeping arm 83 as partial strand 44 to removal opening 45. Partial strand 42 passing through opening 86 is again able to decompress in segment 89 of the settling zone and be conveyed by third sweeping arm 82 to removal opening 45.

The efficiency of the conveyance principle is essentially a function of the frictional conditions of the bulk material relative to the sweeping arms and to floor 34. For this reason, the surface of the sweeping arms coming into contact with the bulk material strand is of a smooth design. In order to increase the frictional resistance of the bulk material relative to the floor 34, the floor is of a profiled design so as to preclude co-rotation of strand 40 along with separating element 5. Macroscopic profiling reveals, for example, advantageously radially configured knobs and grooves. Microscopic profiling can be achieved, for example, by etching or sandblasting, as well as by applying coatings. To this end, it proves to be advantageous overall to design floor 34 so as to be removable from the bin, thereby simplifying its cleaning and enabling selection of a floor best suited for the specific bulk material. In order to enhance the barrier effect against penetrating bulk material, floor 34 can be pressed from below against guide wall 52 of plate 50 by means of pretensioned elements such as, for example, springs or elastomers.

Wear-resistant materials such as ceramic fulfill this function.

Figure 9:
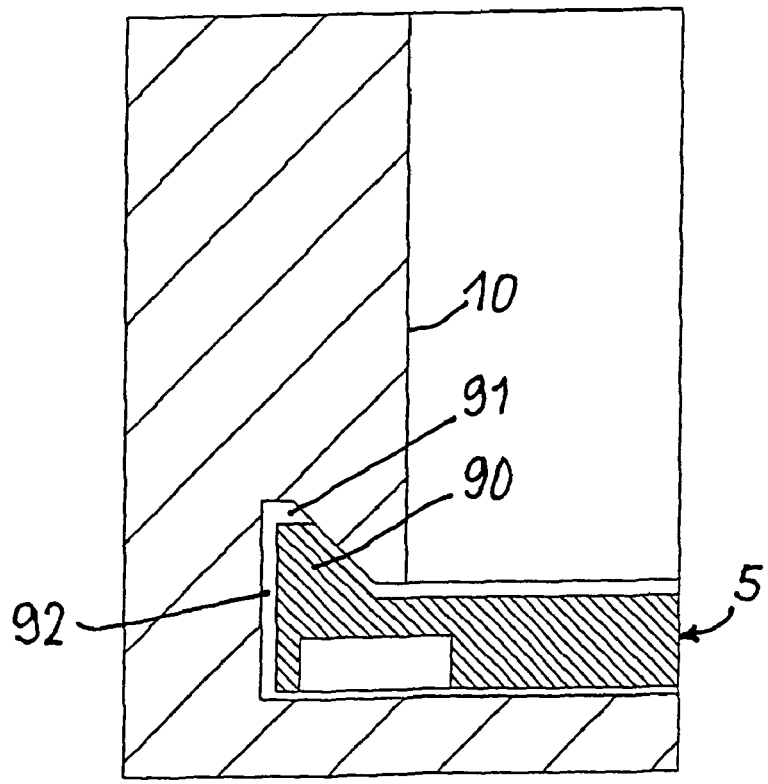
FIG. 9 is a schematic view of a vertical section through part of the bin and of the separating element.

FIG. 9 illustrates a supplemental or alternative possible approach to improving the barrier effect. On the top side of the rim of separating element 5, a profile 90 can be formed that advantageously rises obliquely outward and surrounds separating element 5, this profile engaging a circumferential undercut 91 on the bottom end of inside bin wall 10. The rim of separating element 5 then extends into a cutout 92 in inside bin wall 10. This measure allows a labyrinth to be created for the bulk material, the labyrinth preventing passage of the bulk material past separating element 5 into the removal opening.

Also part of the described apparatus is controller 8 that controls the drive and the speed of motor 4. This scale on which bin 1 rests has weighing cells, for example, in the form of strain gauges 2, 32, the output signals of which, representing the bin weight, are supplied through cable X to a controller input. In controller 8, these output signals are combined with timing signals supplied by a timing element. The resulting combination signal represents the current actual discharge throughput of bulk material through the apparatus in the form of the given weight decrease per unit of time. In controller 8, the combination signal is then compared with a reference signal which represents the desired discharge throughput. The comparison yields an actuating signal for the speed of motor 4 that is fed to the motor through cable Y, since the discharge throughput is approximately proportional to the speed. The speed of the separating element is not subject to any functional limitations. A speed between approximately 0.5 rpm and approximately 10 rpm is recommended for many applications.

The output signal from the weighing cells (strain gauges 2, 32) is fed to a motor actuator 24, specifically, through a comparator unit not shown. Two parameters each adjustable as a function of the type of bulk material are stored in this unit, specifically, the minimum weight of the filled bin that is not to be exceeded on the low side, and the maximum weight of bin 1 that is not to be exceeded. When the output signal from the weighing cells reaches the minimum weight, the comparator unit causes motor actuator 24 to open charging door 23, thereby charging bin 1 with bulk material. When the above-mentioned output signal reaches the maximum weight, actuator motor 24 closes charging door 23.

For purposes of metering certain bulk materials, it may prove advantageous if the surface of separating element 5 is not flat but of a raised conical shape, in other words, the top side of separating element 5 is shaped so as to be tapered radially outward. As a result, the flow of bulk material is assisted from inside radially outward to feed zone 60 and to feed opening 56, thus assisting the complete emptying of bin 1. The cone can be a component separate from separating element 5, the component being disposed in fixed fashion above the separating element and connected by radial braces to bin 1.

Figure 10:
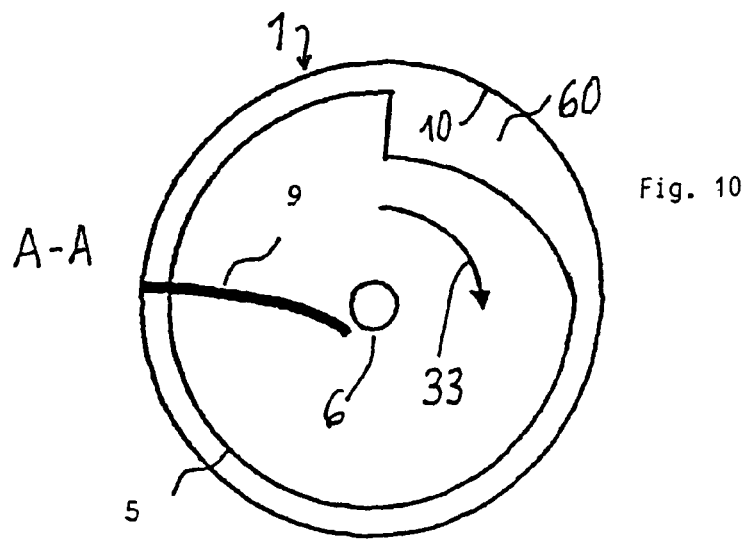
FIG. 10 is a schematic top view of a detail from the apparatus of FIG. 1.

In a supplemental embodiment of the invention, bin 1 of FIG. 10 is equipped with a fixed stator 9 above separating element 5, which stator at least impedes, and in the most favorable case prevents, co-rotation of the bulk material with the separating element, and assists the complete emptying of the bin. If the cone is a separate component, the braces can assume the function of the stator which is then not required. As FIG. 10 illustrates, stator 9 extends radially approximately up to the rotational axis of separating element 5, and may be slightly curved against the rotational direction of the separating element, thereby conveying interior bulk material radially outward to feed zone 60. In addition, it may be advantageous if at least one radially-extending agitating element 21 coupled to drive shaft 6 is provided, which element assists the flow of the bulk material.

In a simplified embodiment of the invention, the controller can be eliminated. In this case, a constant actuating signal is sent to motor 4, thereby setting a specific discharge throughput approximately proportional to the motor speed.

What is obviously critical to the invention in terms of driving the separating element is only the separating element's rotation relative to the bin. An approach is therefore within the scope of the invention whereby the separating element is attached in static fashion and the bin is rotated, for example, by drive shaft 6.

The invention claimed is:

1. An apparatus for the metered removal of bulk material from a bin having a top bulk-material-filling opening and a bottom bulk-material-removal opening, the apparatus comprising:
   a rotor;
   a separating element operatively coupled to the rotor;
   at least one sweeping arm coupled at a bottom side of the separating element and disposed inside the bin near a floor of the bin and directed towards the removal opening;
   wherein a steadying zone is provided below the separating element in front of the sweeping arm, the steadying zone being open in the direction of the bulk material only through a feed opening in the separating element, the steadying zone being open in the direction of the removal opening.

2. The apparatus according to claim 1, wherein the separating element comprises the feed opening.

3. The apparatus according to claim 2, wherein a bulk material strand resting on the floor and being fed in below the rotating separating element is dissociated from the separating element.

4. The apparatus according to claim 3, wherein the separating element is a plate extending essentially transverse to the centerline of the bin.

5. The apparatus according to claim 4, wherein an effective surface of the feed opening extends essentially parallel to the rotational axis of the separating element.

6. The apparatus according to claim 4, further comprising a feed zone formed in front of the feed opening.

7. The apparatus according to claim 3, wherein the separating element has along its periphery a guide wall extending downward to the floor.

8. The apparatus according to claim 7, wherein the feed zone is delimited by a passage through the top side of the separating element.

9. The apparatus according to claim 7, wherein the periphery of the separating element is displaced radially inward along the feed zone.

10. The apparatus according to claim 9, wherein the sweeping arm is at a distance circumferentially relative to the feed opening and terminates at one end at the removal opening and transitions at the other end into the guide wall.

11. The apparatus according to claim 10, wherein the sweeping arm is a spiral sweeping arm, and wherein at least one section of the spiral sweeping arm forms part of the guide wall.

12. The apparatus according to claim 11, wherein the section of the sweeping arm delimits the feed zone.

13. The apparatus according to claim 3, wherein the separating element has a ramp rising from the lower end of the element.

14. The apparatus according to claim 13, wherein the ramp having a width, and wherein the feed opening is formed inside the width of the ramp.

15. The apparatus according to claim 14, wherein the ramp is of a greater height than the feed opening.

16. The apparatus according to claim 7, further comprising one or more additional sweeping arms attached to the bottom side of the separating element and being circumferentially spaced apart from each other, each sweeping arm having a different radial distances from the guide wall than the other sweeping arms.

17. The apparatus according to claim 16, wherein one segment each of the settling zone is formed in front of each sweeping arm.

18. The apparatus according to claim 17, wherein the segments are of different lengths circumferentially.

19. The apparatus according to claim 16, wherein the ends of the sweeping arms terminate at the removal opening at mutually identical circumferential distances.

20. The apparatus according to claim 16, wherein the sweeping arm(s) is/are directed in a straight line toward the removal opening.

21. The apparatus according to claim 16, wherein the sweeping arms have a spiral shape.

22. The apparatus according to claim 21, wherein the sweeping arms have the same curvature.

23. The apparatus according to claim 16, wherein the different radial distance of the sweeping arms from the guide wall allows each of the sweeping arms conveys a portion of the bulk material strand to the removal opening, while allow the remaining part of the bulk material strand to pass.

24. The apparatus according to claim 7, wherein a circumferential profile rises from the top side of the separating element along its rim, the profile engaging a circumferential undercut in the inside bin wall so as to create a labyrinth that prevents penetration of the bulk material.

25. The apparatus according to claim 7, wherein elastic elements such as, for example, springs are provided that press the floor against the sweeping arm(s) and the guide wall.

26. The apparatus according to claim 1, wherein the surface of the separating element is provided with an anti-adhesion coating.

27. The apparatus according to claim 1, wherein the top side of the separating element is designed in an outwardly tapered fashion analogous to a cone.

28. The apparatus according to claim 1, wherein the floor of the bin is removably attached to the bin.

29. The apparatus according to claim 1, wherein the floor is profiled according to the type of bulk material.

30. The apparatus according to claim 1, further comprising a stator provided above the separating element, the stator being connected to the bin and extending radially.

31. The apparatus according to claim 30, wherein the stator extends horizontally and approximately to the rotational axis.

32. The apparatus according to claim 30, wherein the stator is curved.

33. The apparatus according to claim 30, further comprising a separate cone is provided above the separating element, the cone being connected by radial braces to the bin wall.

34. The apparatus according to claim 30, further comprising an agitating element co-rotating with the separating element is provided above the stator or above the cone.

35. The apparatus according to claim 34, wherein the agitating element is rod-shaped and extends radially.

36. The apparatus according to claim 1, wherein the bin rests on a scale having weighing cells.

37. The apparatus according to claim 36, further comprising a controller connected with the weighing cells and having means to provide control signal for the speed of the motor actuator for the separating element or the bin, wherein the control signal is generated from a comparison between an actual discharge throughput signal and a set point, wherein the actual discharge throughput signal coming from a signal received by the weighing cells and from a timing element, and wherein the set point equals to a specified target discharge signal.

38. The apparatus according to claim 37, further comprising a charging door attached to the bin is controlled by an actuator motor that receives signals from the weighing cells.

39. An apparatus for the metered removal of bulk material from a bin, the bin having a floor, a removal opening in the floor, and a filling opening, the apparatus comprising:
 a rotor;
 a separating element located in the bin and operatively coupled to the rotor, the separating element comprising:
  a plate;
  an outer guide wall extending from a bottom side of the plate toward the floor of the bin;
  a feed opening at least partially defined by the guide wall and the plate, and configured to receive bulk material;
  at least one sweeping arm extending from a bottom side of the plate toward the removal opening and floor of the bin, the at least one sweeping arm configured to convey at least a portion of the bulk material from the feed opening and outer guide wall and inward into the removal opening;

a steadying zone at least partially defined by the plate and the sweeping arm, the steadying zone being open in a first direction only toward the feed opening and open in a second direction toward the removal opening of the bin.

* * * * *